Sept. 19, 1933. C. F. GERLINGER 1,927,088
SIX-WHEELED LUMBER CARRIER
Filed June 9, 1930 8 Sheets-Sheet 1
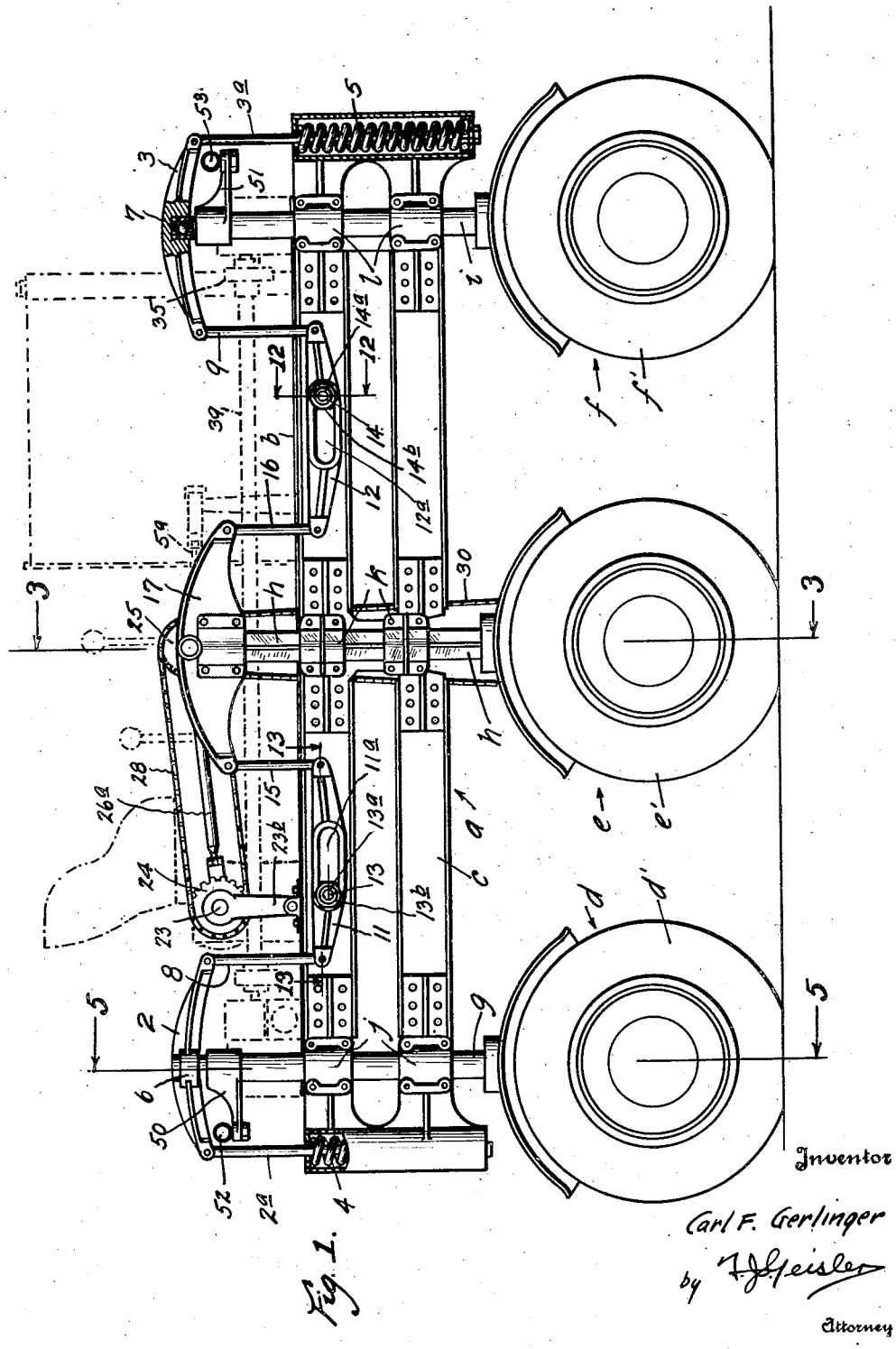
Inventor
Carl F. Gerlinger
by
Attorney Sept. 19, 1933.   C. F. GERLINGER   1,927,088
SIX-WHEELED LUMBER CARRIER
Filed June 9, 1930   8 Sheets-Sheet 2
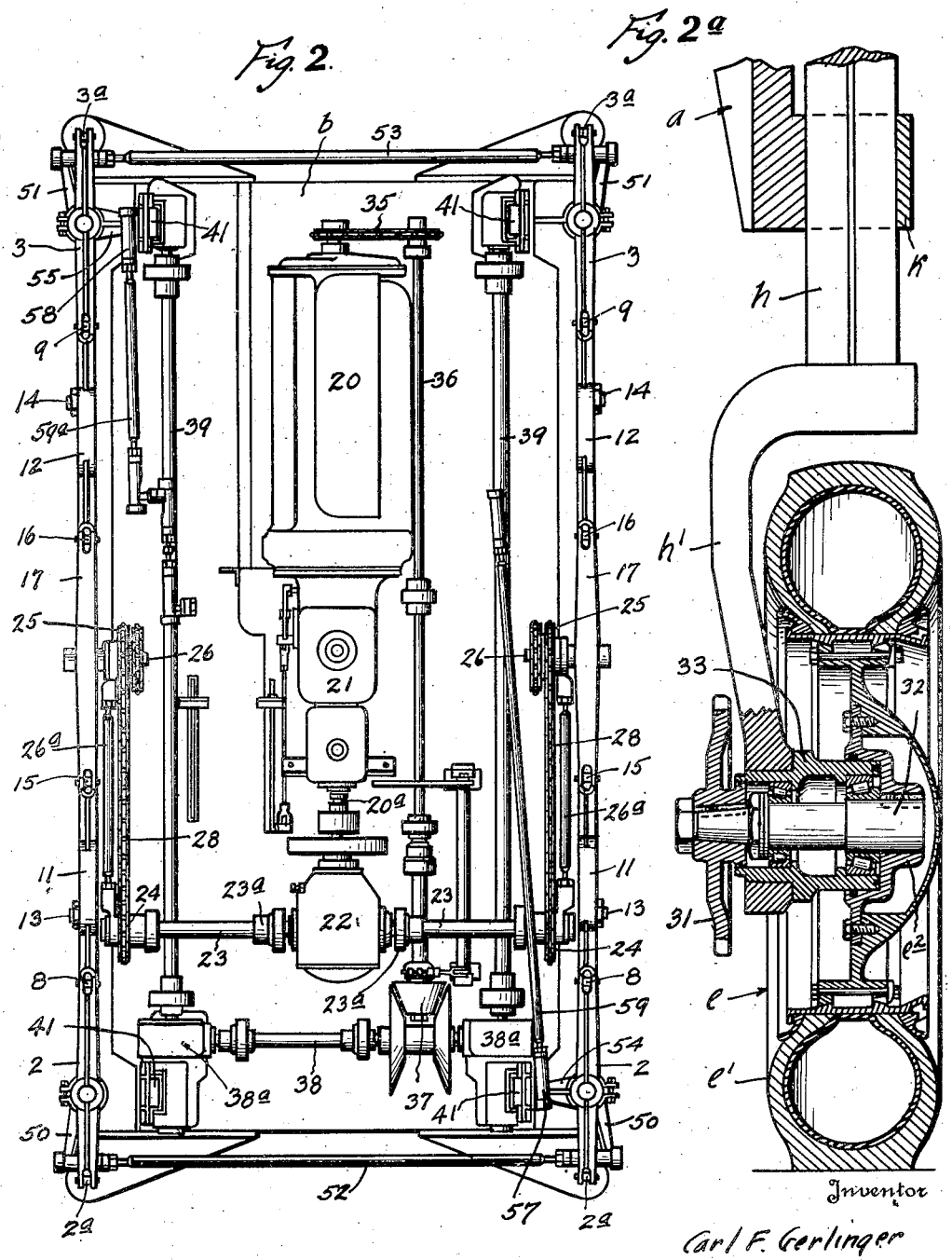

Sept. 19, 1933.   C. F. GERLINGER   1,927,088
SIX-WHEELED LUMBER CARRIER
Filed June 9, 1930    8 Sheets-Sheet 3
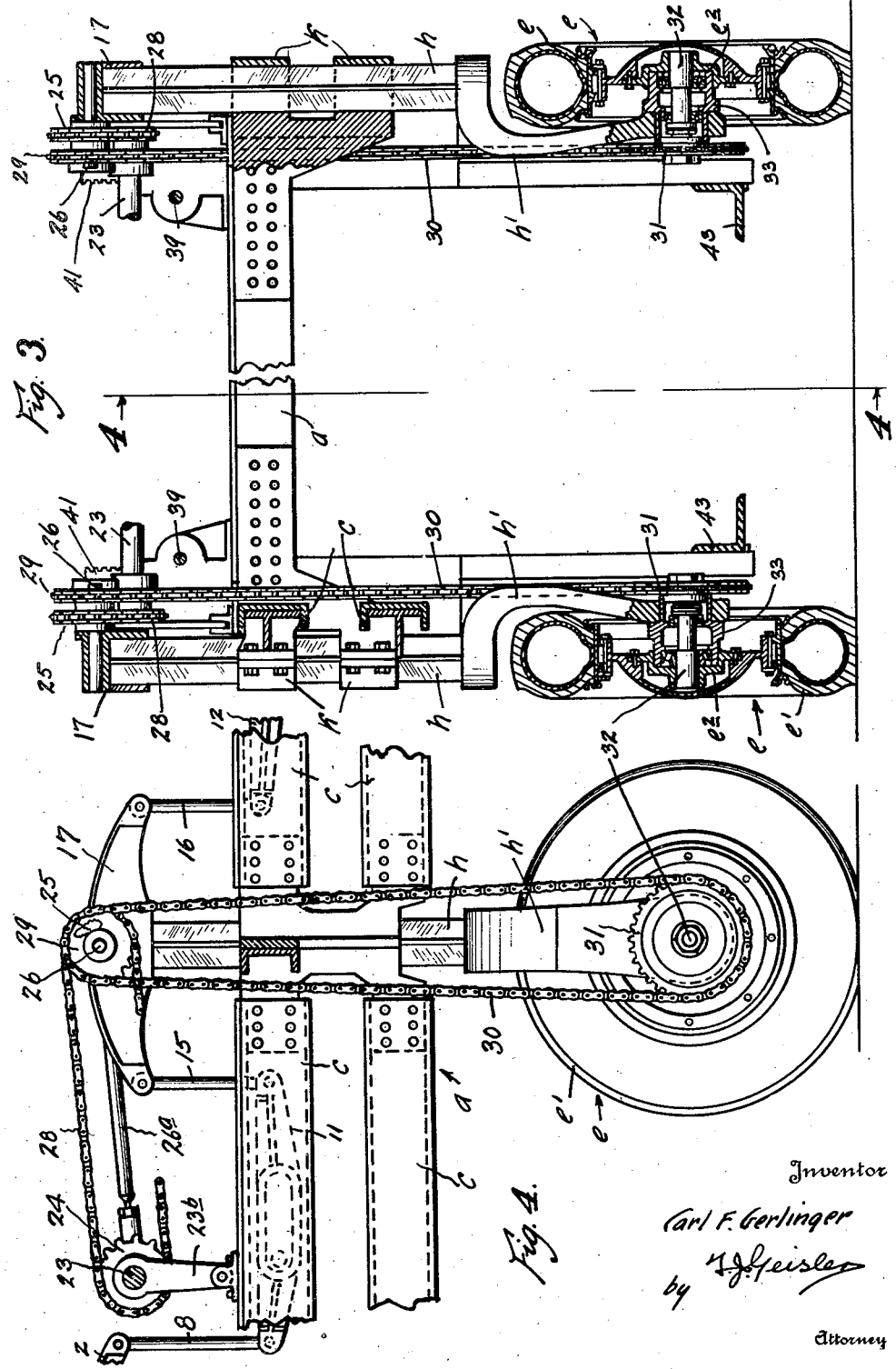

Sept. 19, 1933.  C. F. GERLINGER  1,927,088
SIX-WHEELED LUMBER CARRIER
Filed June 9, 1930    8 Sheets-Sheet 4
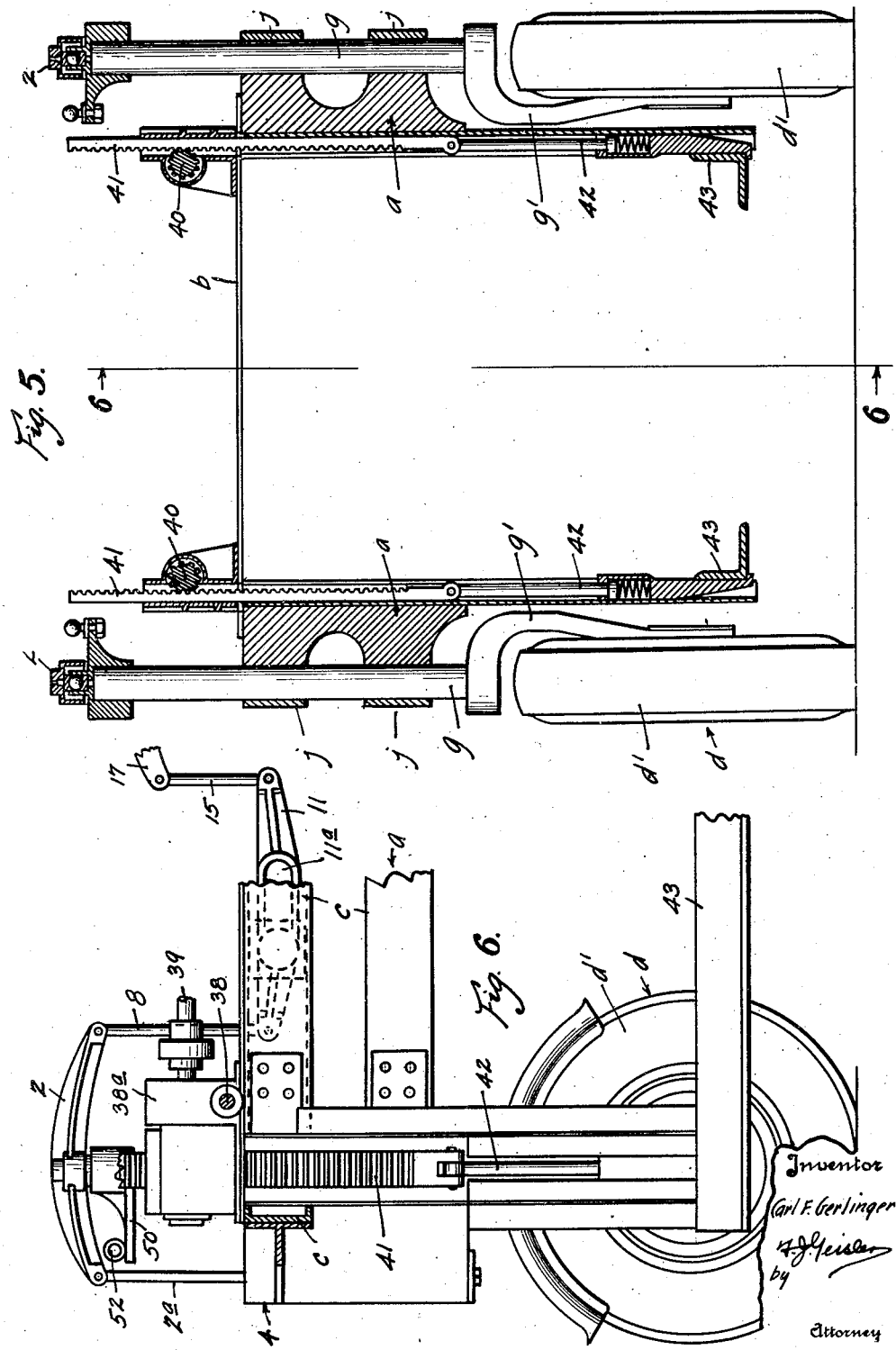

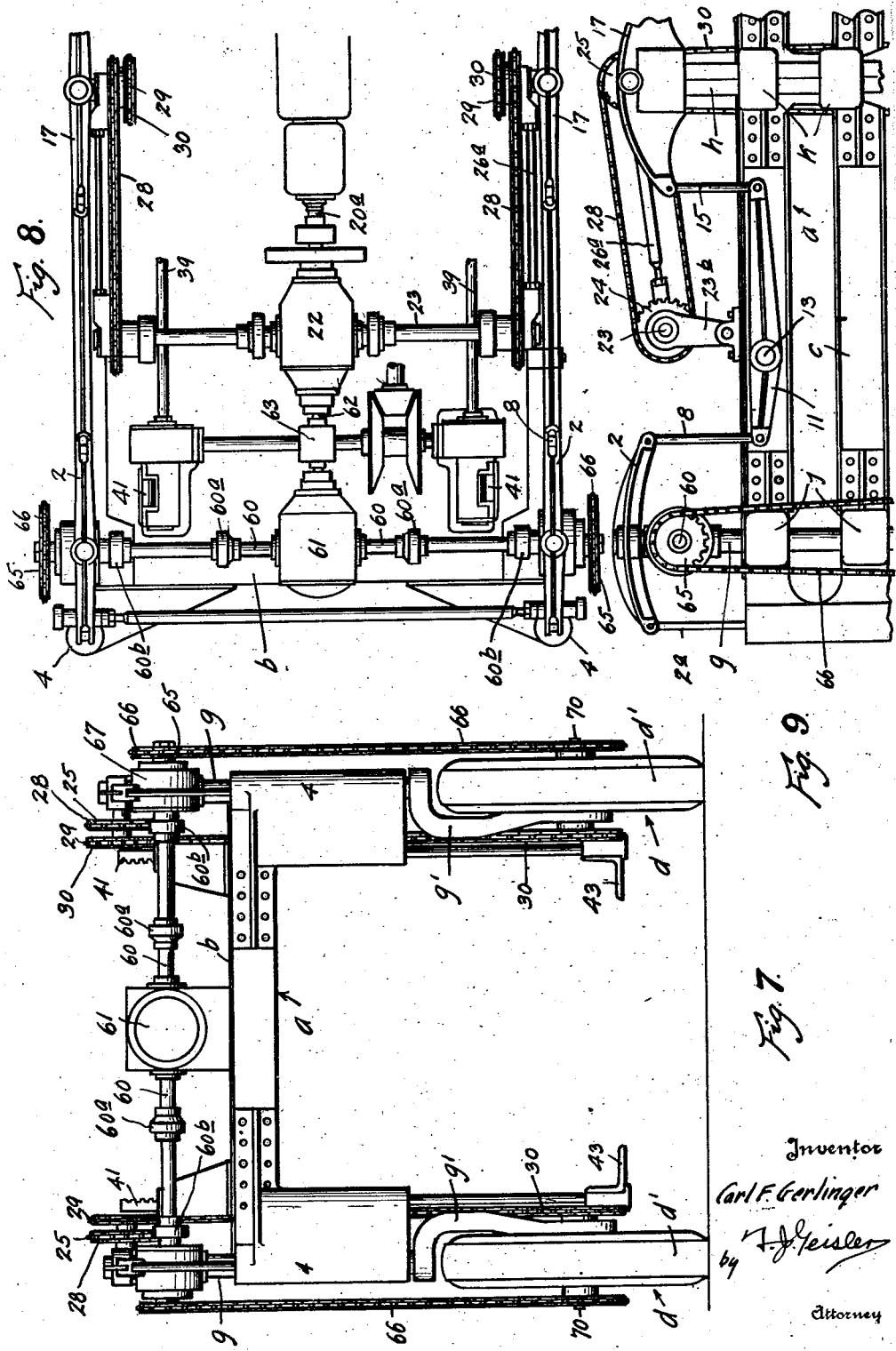

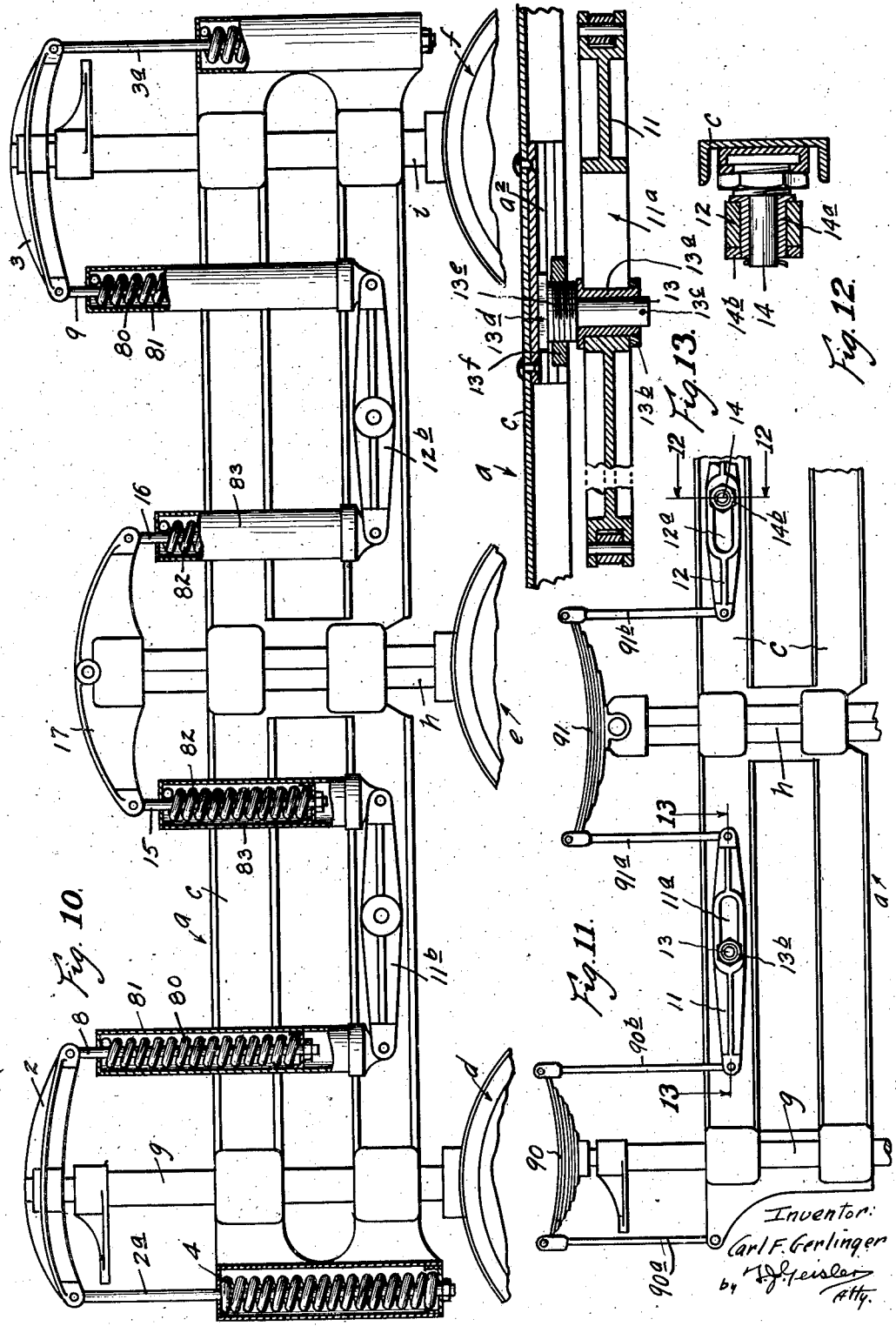

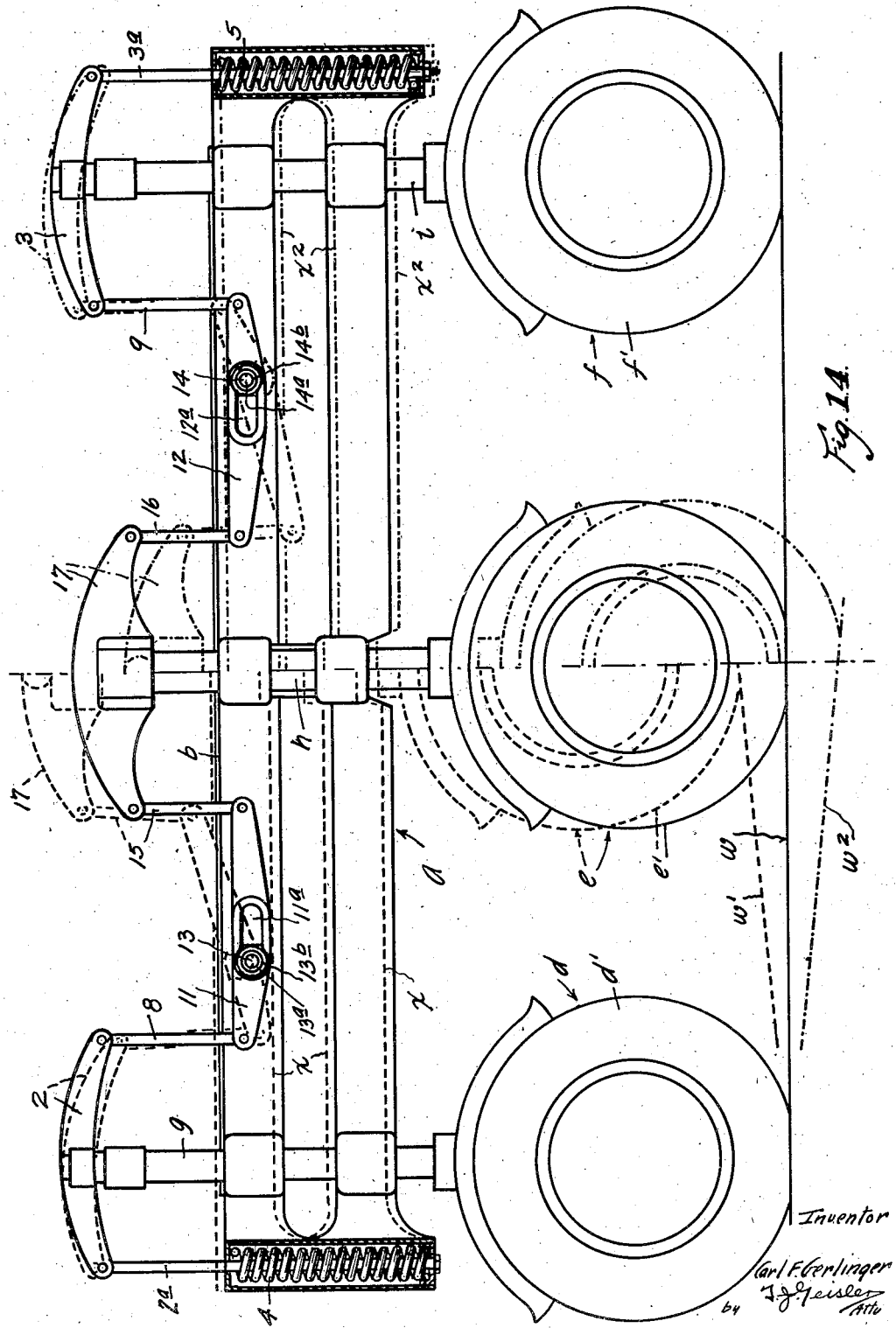

Sept. 19, 1933.     C. F. GERLINGER                1,927,088
                  SIX-WHEELED LUMBER CARRIER
                   Filed June 9, 1930      8 Sheets-Sheet 8

Inventor
Carl F. Gerlinger
by T. J. Geisler
Attorney

Patented Sept. 19, 1933

1,927,088

UNITED STATES PATENT OFFICE 1,927,088

SIX-WHEELED LUMBER CARRIER

Carl F. Gerlinger, Dallas, Oreg.

Application June 9, 1930. Serial No. 459,929

10 Claims. (Cl. 280—104)

My invention relates particularly to motor driven, straddle frame hoisting trucks, commonly used in transporting piles of lumber, and generally known as lumber carriers, and hereinafter referred to as such; but is also applicable to trucks in general.

Heretofore such lumber carriers have been used only about the mill yards, but with the improvement of the public highways, it has become practicable and desirable to use them on the highways for transporting lumber relatively long distances, since the lumber carrier has the advantage over other kinds of motor trucks in that it is adapted to pick up and drop the load as a unit with a consequent saving in time and labor.

However, to adapt the lumber carrier for use on the public highways, certain statutes and regulations relating to motor vehicles must be complied with. They require that the maximum load shall not exceed a given weight at the point of contact of each wheel on the road surface; that motor vehicles be limited to a given maximum width, and in many states, furthermore, all motor vehicles must be equipped with pneumatic tires.

The lumber carriers in present use do not meet these requirements.

In adapting a lumber carrier to meet these requirements, several conditions must be met. The interior dimensions between the sides of the straddle frame must not be diminished, in order that the carrier may be readily driven astride a pile of lumber of present standard width.

Further, in substituting pneumatic tires for solid tires, pneumatic tires must be selected of a size capable of supporting the weight of the load without undue wear on the tires.

To use pneumatic tires of the proper capacity for the lumber carrier would increase the maximum width of the lumber carrier beyond the statutory limit.

Therefore, one of the primary objects of my invention is to provide a lumber carrier whose running gear comprises more than four wheels in order so to distribute its load over the road surfaces as to stay within the said statutory limits relating to the maximum load which may be supported by each wheel. In this connection, it is necessary to provide for the independent accommodation of the wheels to inequalities in the road surface.

In other words, to maintain the middle wheels respectively in constant load bearing relation with the end wheels respectively, whereby to impose on the middle wheels, respectively, constantly their aliquot part of the load carried by the carrier as a whole.

I attain these main objects by providing a lumber carrier having a series of wheel-mounted, vertically slidable standards supporting the carrier at its sides, said standards located at the ends and intermediate thereof, and provided with a system of levers independently connecting the sides of the frame with said standards; the said system of levers arranged to permit the independent vertical displacement of the intermediate wheels, due to inequalities in the road surface, from the plane on which the end wheels bear without disturbing the distribution of the load over the entire wheel base.

A further object of my invention is to provide means for steering my lumber carrier, whereby the end wheels will be cooperatively connected together for rotation in a horizontal plane and the intermediate wheels will be stationary relative to such rotation, so that when the vehicle is turned, the middle set of wheels will travel in an independent arc having, however, the same degree of curvature as the arc in which the steering ground wheels are turned, so that no resistance to the turning movement of the vehicle will be created and undue wear on the tires prevented.

A still further object of my invention is so to construct and arrange the operative elements of my carrier as to permit the use of more than four wheels and pneumatic tires without either impairing the interior dimensions between the straddle frame or increasing the maximum width beyond the statutory limit; also to provide for the driving of four wheels if preferred.

These objects and other incidental features of my invention, the details of construction thereof, and mode of operation, are hereinafter fully described with reference to the accompanying drawings.

In the drawings:

Fig. 1 shows a side elevation of a motor driven lumber carrier embodying my invention and illustrates the certain details of construction;

Fig. 2 shows a plan view of the truck shown in Fig. 1 and illustrates the arrangement of the motor and driving and steering connections;

Fig. 2a shows an enlarged section similar to the section of the wheel shown in Fig. 3;

Fig. 3 shows a transverse section taken on the line 3—3 of Fig. 1 and illustrates the driving connections to the intermediate ground wheels;

Fig. 4 shows a longitudinal section taken on the line 4—4 of Fig. 3 and illustrates further details of the driving connections;

Fig. 5 shows a transverse section taken on the line 5—5 of Fig. 1;

Fig. 6 shows a longitudinal section taken on the line 6—6 of Fig. 5;

Fig. 7 shows a rear end elevation of a modified form of my carrier having a four wheel drive;

Fig. 8 shows a fragmentary plan view of this modification and illustrates further details of construction;

Fig. 9 shows a fragmentary side elevation of the portion of my carrier shown in Fig. 8;

Fig. 10 shows a further modification of my carrier in that the equalizing means for the ground wheels are provided with individual shock absorbing devices;

Fig. 11 shows a further modification of my invention in that resilient levers are provided on the standards as a substitute for the shock absorbing devices, before shown;

Fig. 12 shows an enlarged section taken on the lines 12—12 of Figures 1 and 11 and illustrates the details of the adjustable fulcrum for the secondary lever carried by the frame;

Fig. 13 shows an enlarged horizontal section taken on the lines 13—13 of Figures 1 and 11 and illustrates further details of construction of the said adjustable fulcrum;

Fig. 14 shows a diagrammatic side elevation of my carrier and illustrates by broken lines the relative individual automatic adjustment of the ground wheels in accommodating themselves to an uneven ground surface;

Figure 15:
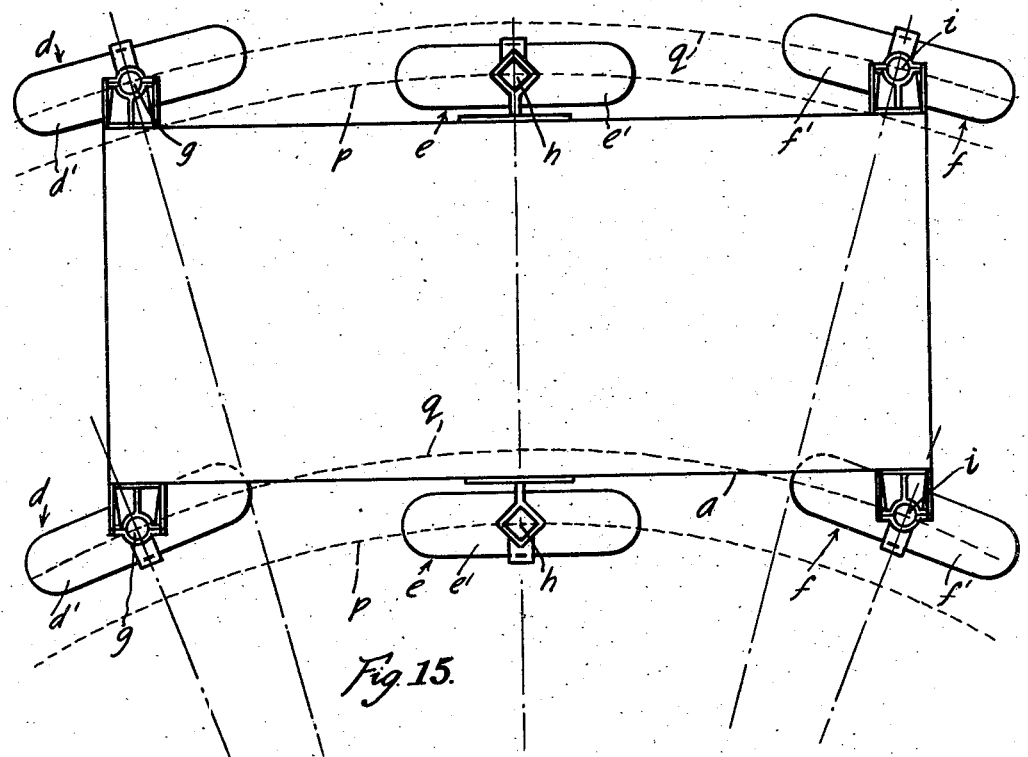
Fig. 15 illustrates in a diagrammatic plan view the relative turning movement of the wheels when a change in direction is being made.

Referring now to the drawings and particularly to Figures 1 to 6, my lumber carrier comprises a six-wheeled straddle frame $a$ having a deck $b$ and downwardly extending sides $c$, on which the motor and hoisting devices are carried, as will be hereinafter further described.

The frame $a$ is supported on the ground wheels $d$, $e$, $f$, provided with pneumatic tires $d'$, $e'$, $f'$, of the required size and weight capacity to provide the most efficient service. The said wheels are journaled independently of each other, in offset extensions $g'$, $h'$, $i'$, on the lower ends of upright standards $g$, $h$, $i$, which are mounted for limited vertical movement in lateral bosses $j$, $k$, $l$, on the exterior of the frame sides at each side the carrier.

The frame $a$ is connected to and supported by the said standards $g$, $h$, $i$ by means of primary levers 2, 3, pivotally fastened by links $2a$, $3a$, at their outer ends to resilient spring shock absorbing elements 4, 5, carried by the said frame. The levers 2, 3, are pivotally fulcrumed on the upper ends of the standards $g$, $i$, as at 6, 7, and their other ends are connected by pendent links 8, 9, to secondary levers 11, 12, fulcrumed on the frame $a$, on pins 13, 14. The other ends of the levers 11, 12 are connected by links 15, 16, with cross-heads 17 provided on the upper ends of the standards $h$.

By these means, the wheels $d$, $e$, $f$, are permitted individual vertical displacement on each side the carrier, due to unevenness of the road surface from the plane on which the end wheels bear without disturbing the distribution of the load over the entire wheel base.

Figure 16:
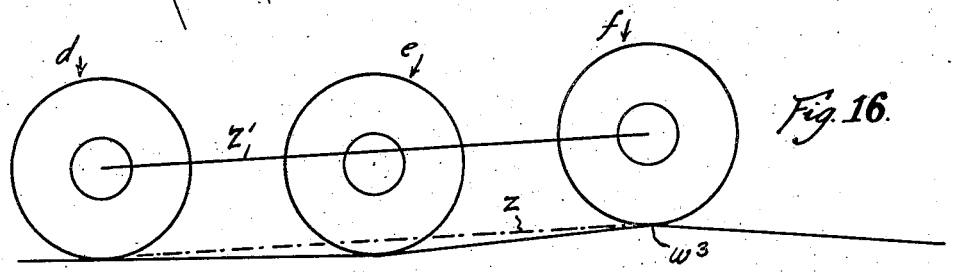
Fig. 16 illustrates diagrammatically the actual relative displacement of the intermediate wheel when the front wheel is resting on an elevation in the road surface.
Figure 18:
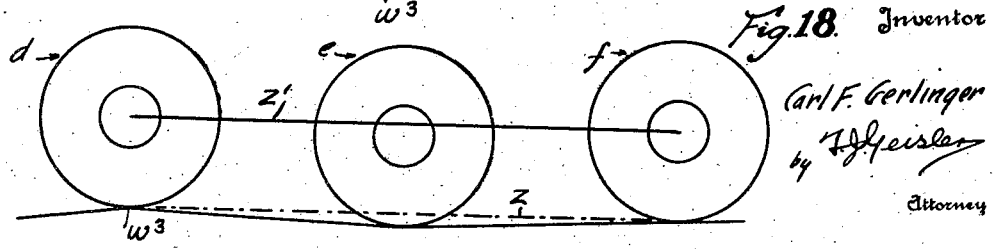

The relative movements of the said ground wheels as they adjust themselves to unevenness of the road surface are diagrammatically illustrated in Figures 14, and 16, to 18.

In Figure 14, the full lines indicate the position of the carrier and its wheels when passing over a level and even road surface, as $w$, but the broken lines $x$ in the left half of the figure, represent the position assumed when the middle wheel $e$ passes over an elevation, as $w'$.

As the relative movement of the ground wheels and their standards on each side the frame will be independent, but similar, I will only describe movements of those on one side.

As illustrated by the left-hand portion of Figure 14, the vertical displacement of the intermediate wheel has raised the standard $h$ and the cross-head 17, which, through the links 15, 16, has tilted the secondary levers 11, 12 drawing the inner ends of the levers 2, 3 downward by means of the links 8, 9, which exert a downward force on the standards $g$, $i$.

But since the standards $g$, $i$ cannot move downward in response to the force of the levers 2, 3, because the wheels $d$, $f$ are resting on the ground, the frame $a$ is raised, as indicated by the broken lines $x$. In other words, the greater upward thrust of the wheel $e$ is distributed over the standards $g$, $i$, and absorbed in lifting the frame $a$ slightly, so that the weight of the carrier is thus equally distributed over the entire wheel base. Further, by providing such vertical movement of the frame $a$ relatively to the ground wheels, the frame $a$ is relieved of any stresses which might result from one wheel resting on a higher level than the others.

The relative vertical movements of the wheels $d$, $e$, $f$, when they ride into a depression as $w2$ in the road surface, are indicated by the broken lines $x2$ in the right half of Figure 14.

In this case, the downward vertical displacement of the wheel $e$ and standard $h$, moves the cross-head 17 downward, which correspondingly tilts the secondary levers 11, 12 causing their outer ends to rise, and to tilt the levers 2, 3 on their fulcrum and the frame to correspondingly move downwardly, so that the weight of the carrier is equally distributed over all the wheels $d$, $e$, $f$, as before described.

Figure 17:
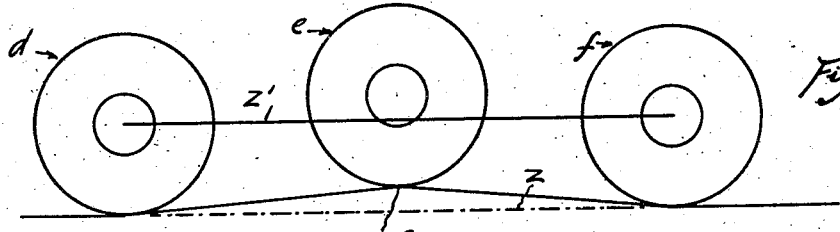
Figs. 17, and 18 show, respectively, the progress of the carrier over such elevation and illustrate the actual displacement of the intermediate wheel when either the latter or a rear wheel is resting on the said elevation.

It is to be noted, with reference to Figures 16 to 18, that since the end wheels $d$, $f$, always ride on a common plane, as $z$, that any unevenness of the road surface, actually causes only a vertical displacement of the wheel $e$.

Figure 16 illustrates my carrier approaching a high spot or elevation, $w3$, in the road surface, in which the wheel $f$ is apparently displaced upwardly, but as it always rests on the common plane $z$ with the wheel $d$, the frame $a$, represented by the line $z'$, being a rigid structure, the wheel $e$ as it follows the ground surface, moves below the said plane $z$ and is actually displaced relatively to the end wheels $d$, $f$.

Figure 17 illustrates the progress of my carrier over the elevation $w3$ and the wheel $e$ resting on the said elevation. In this case, it will be noted that the wheel $e$ is displaced above the common plane $z$.

Figure 18 illustrates the further progress of my carrier over the high spot $w^3$ in which the wheel $d$ is apparently displaced, but the wheel $e$ is actually displaced relatively to the said plane $z$. Thus, by comparison with Figs. 16 and 17, it will be noted that the apparent displacement of either the wheels $d$, $f$, is actually a displacement of the wheel $e$ in the opposite direction.

Further, since the portion of the frame $a$, represented by the line $z'$ in Figs. 16, 17 and 18, under which the wheel $e$ is journaled, will always be the greater or less distance from the ground surface than the ends of the frame, the relative movement of the standard $h$ will always be the greatest. In order to compensate for the said greater vertical movement of the wheel $e$ as it follows the ground surface, I have located the fulcrums of the primary levers 2, 3 indicated at 6 and 7, see Figs. 1 and 14, somewhat closer to the outer or fixed ends, so that the vertical motion transmitted to the end wheels $d$, $f$ from the center wheel $e$, will be proportionately less. Thus, the center wheel $e$ will always be held in equal load bearing contact on the road surface with the end wheels $d$, $f$.

Otherwise, if the motion transmitted to the end wheels is equal to the displacement of the center wheel, the latter will either be lifted off the road surface or will bear a greater or less proportion of the load bearing strain, depending upon whether the center wheel has been initially raised or lowered by the road surface.

Further, in order to reduce the movement of the frame $a$ relatively to the standards $g$, $h$, $i$, which, if the secondary levers 11, 12 were fulcrumed at their middle points would be one-half the displacement of the wheel $e$, I have fulcrumed the secondary levers 11, 12 nearer the outer ends, which are connected to the levers 2, 3 so that the vertical motion transmitted to the latter from the wheel $e$ and standard $i$ will be reduced and thus the relative movement of the frame $a$ reduced.

Furthermore, in order to permit the amount of motion transmitted from the standard $i$ to the standards $g$, $h$, to be varied to meet special conditions, such as a very rough road surface, in which the relative displacements of the wheel $e$ will be greater so that the motion transmitted to the said standards $g$, $i$ must be correspondingly increased to permit such relatively greater movement of the wheel $e$, I have made the fulcrums of the levers 11, 12 horizontally movable.

In Fig. 11 I have illustrated the fulcrums of the secondary levers 11, 12 adjusted at the centers of the said levers to meet such condition of the road surface.

To this end the levers 11, 12 are provided with elongate slots 11$a$, 12$a$, in which the pins 13, 14 are respectively journaled in bushings 13$a$, 14$a$, see Figs. 11 and 12, having nuts 13$b$, 14$b$, threaded on their outer ends, by which they are clamped in the said grooves in a desired position. Keys 13$c$ are inserted through the ends of the pins 13 to hold the bushings in place.

The pins 13 are provided with a square head 13$d$ and threaded shoulder 13$e$. The heads 13$d$ are slidably mounted in grooved channel members $a$2 on the adjacent portion of the sides $c$ of the frame $a$, since the pins 13 must, of course, be adjustable on the frame $a$ as well as on the levers 11, 12. A nut 13$f$ is threaded on the shoulder 13$e$ by which the said pins are clamped in the grooved channel members $a$2.

The driving means of my carrier and their connection with the ground wheels $e$ comprise (see Fig. 2) a motor 20 supported on the deck $b$, the rearward end of the drive shaft 20$a$ of which is connected through a suitable transmission 21 and differential 22, with a transversely arranged shaft 23. The shaft 23 is provided on each end with sprocket wheels 24. Similar sprocket wheels 25 (see Fig. 4) are journaled on stub shafts 26 journaled in the upper ends of the standards $h$. A rigid but adjustable rod 26$a$ is provided between the said shaft 23 and the stub shaft 26 to hold them properly spaced. Sprocket chains 28 are arranged over the said sprockets. Flexible couplings 23$a$ are provided in the transverse shaft 23 and the ends of the said shaft are supported on pivoted arms 23$b$. By this construction, a flexible driving connection is provided between the shaft 23 and the stub shafts 26, which permit a vertical movement of the said standard $h$.

Similar sprockets 29 are also mounted on the said stub shafts 26 and provided with chains 30 extending downward over sprockets 31 mounted on the axles 32 of the wheels $e$, see Figs. 3 and 4. The axles 32 are secured fast to the hubs $e$2 of the said wheels $e$ and are journaled in journal bearings 33 carried by the lower ends of the offset extensions $h'$.

But since I provide offset extensions $g'$, $h'$, $i'$, instead of forks, adapted to curve about the tires $d'$, $e'$, $f'$, and conserve the width of the carrier, the axles 32 are only supported at one end, and therefore for strength, I journal the said axles in the internal hubs $e$2 of the wheels $e$ within the concavity of their dished bodies, so that the weight of the carrier is distributed over a greater portion of the axles.

The manner of mounting the sprockets 31 fast on the axles 32 of the wheels $e$ instead of on the wheel itself, permit the use of wide tires and conserve the space between the exterior of the carrier and the interior dimensions between the sides thereof.

The wheels $d$ and $f$ are similarly mounted, as illustrated in Fig. 5, except that their axles do not extend through their extensions and are not provided with sprockets.

The hoisting means I provide for picking up and depositing a pile of lumber, see Figs. 2, 5, and 6, comprise an offset driving connection 35 from the forward end of the drive shaft 20$a$ of the motor 20 to a longitudinally arranged shaft 36. The shaft 36 is connected to a friction clutch 37 adapted to transmit power to a transversely arranged shaft 38 extending from each side of the said clutch.

The shaft 38 is connected at its outer ends by suitable gearing, as at 38$a$, with longitudinally arranged shafts 39 on each side the motor 20. The ends of the shafts 39 are provided with pinions 40, see Fig. 5, meshing with vertically arranged racks 41. The lower ends of the racks 41 are connected respectively by rods 42 with longitudinally arranged hoisting shoes 43 on each side the carrier and within the said sides, see Figs. 5 and 6.

By these means, the motor is adapted to operate the hoisting means independently of its driving connections.

The steering devices of my carrier comprise the standards $g$, $i$, which are cylindrical in section so as to be rotatable about their longitudinal axes, but the standards $h$ are more or less rectangular in section and are thus fixed relatively to such motion, see Figs. 1 and 14.

Lateral arms 50, 51, see Fig. 2, are secured to the upper ends of the standards $g$, $i$ below the levers 2, 3. The lateral arms 50 on the standards g at the side of the carrier are connected by a spreader rod 52, and the arms 51 on the standards i are connected by a similar spreader rod 53.

Secondary arms 54, 55 are also provided on the standards g, i, at diagonally opposite corners of the carrier, respectively, to which steering knuckles 57, 58 are connected. The steering knuckles 57, 58 are connected by suitable rods 59, 59a with the steering wheel of the carrier, not shown.

By this construction, referring to Fig. 15, since my carrier is steered by the end wheels and the intermediate wheels are relatively fixed, when the wheels d, f are rotated in a horizontal plane to change the direction of the carrier, the wheels e will follow on a path p which is an independent arc, however, having a curvature equal to the curvature of the arc which is the path q of the wheels d, f. In other words, all the wheels will travel over segments of circles having a common center, and thus there will be no resistance of the tires on the road surface to the turning movement of the carrier and undue wear on the tires will be prevented.

Referring now to Figs. 7, 8, and 9, I have shown a modification of my carrier in which I have provided driving connections for four wheels instead of two, as previously described, which, under some circumstances, becomes desirable, as where steep grades are to be encountered.

The driving connections to the intermediate wheels e are the same as before described, but in order to provide both a flexible and differential transmission for the wheels d which are necessary because not only do the standards g move vertically and individually but since the wheels d turn on a different arc when the vehicle is steered, an independent differential transmission must be provided.

In order to provide for vertical and individual movement of the standards g, I have provided a transverse shaft 60 having a differential transmission 61 connected to the main drive shaft 20a through the differential 22 by means of a stub shaft 62 having a universal coupling 63. The transverse shaft 60 is also provided with a pair of universal couplings 60a, 60b on each side the differential 61, and the ends of the said shaft are journaled on the upper ends of the standards g in journal housings 67 on which the levers 2 are fulcrumed. The journal housings 67 are rotatably mounted on said standards in order to permit the latter to be rotated when the carrier is steered. By this construction, the vertical movement of the standards g are permitted without interfering with the driving connection from the motor by means of the flexible couplings in the said shaft 60.

Sprockets 65 are provided on the outer ends of the shafts 60 having a chain 66 arranged thereover and over sprockets 69 secured on the exterior ends of the axles 70 of the wheel d. In this construction, the width of the carrier is increased a few inches on each side but may still be maintained within the maximum width limit.

Referring now to Figs. 10 and 11, I have shown further modifications of my invention in which resilient shock absorbing devices are provided for each end of the levers 2, 3, and 11, 12.

Figure 10 shows the links 8 by which the levers 2, 3 are connected to the secondary levers 11b, 12b, provided with compression springs 80 arranged in housing 81, which are pivotally connected to the secondary levers 11b, 12b. Similarly the links 15, 16 connecting the levers 11b, 12b, with the cross-head 17, are provided with compression springs 82 arranged in housings 83 carried by the said secondary levers 11b, 12b. By these means, a more sensitive and responsive shock absorbing element is provided.

In Fig. 11, I have shown a further modification of my invention in which the levers 2, 3 on the standards g, i and the cross heads 17 on the intermediate standards h, have been replaced by laminated springs 90, 91. The springs 90 are pivotally mounted on the standards g, i similarly to the levers 2, 3, and are connected to the frame at their outer ends by links 90a and to the secondary levers 11 and 12 at their inner ends by link 90b. The cross head springs 91 are connected at their ends to the inner ends of the lever 11 by links 91a, 91b. In this embodiment the mode of operation is exactly the same as heretofore described, except that, as before mentioned, the fulcrums at 13 of the levers 11, 12 are shown as adjusted at their centers rather than nearer their inner ends.

I claim:

1. In a carrier, a body frame, three vertically, independently, movable wheel mounted supports for the ends and the middle of each side of the body frame, load distributing leverage systems comprising primary levers fulcrumed nearer their outer ends on each of said end supports, cross heads carried by each of said middle supports, secondary levers fulcrumed on each side of the body-frame between, and connected with said primary levers and cross heads of the same side, the outer ends of said primary levers being connected with the body frame, the fulcrums of the secondary levers being adjustable.

2. In a carrier, a body frame, three vertically, independently, movable wheel mounted supports for the ends and the middle of each side of the body frame, load distributing leverage systems comprising primary levers fulcrumed nearer their outer ends on each of said end supports, cross heads carried by each of said middle supports, secondary levers fulcrumed on each side of the body frame between, and connected with said primary levers and cross heads of the same side, the outer ends of said primary levers being connected with the body frame, shock absorbing means included in said leverage systems, whereby the middle support on either side of the body frame independently accommodates the vertical displacement of the wheel of said support relatively to the plane on which the end wheels of the same side bear, without diminishing or increasing the aliquot portion of the load which said middle wheel carries.

3. In a straddle-type carrier, a body frame, three wheel-mounted standards supporting the ends and the middle of each side of the body-frame and vertically independently movable in the sides thereof, the standards projecting above the body-frame, load distributing leverage systems comprising primary levers fulcrumed nearer their outer ends on each of said end-standards, cross-heads carried by each of said middle standards, secondary levers fulcrumed on each side of the body-frame between, and connected with said primary levers and the cross heads of the same side, the outer ends of said primary levers being connected with the body frame.

4. In a straddle-type carrier, a body frame, three wheel-mounted standards supporting the ends and the middle of each side of the body-frame and vertically independently movable in the sides thereof, the standards projecting above the body frame, load distributing leverage systems comprising primary levers fulcrumed nearer their outer ends on each of said end standards, cross heads carried by each of said middle standards, secondary levers fulcrumed on each side of the body frame between, and connected with said primary levers and the cross heads of the same side, the outer ends of said primary levers being connected with the body frame, and shock absorbing means included in said leverage systems.

5. In a straddle-type carrier, a body frame, three wheel-mounted standards supporting the ends and the middle of each side of the body-frame and vertically independently movable in the sides thereof, the standards projecting above the body frame, load distributing leverage systems comprising primary levers fulcrumed nearer their outer ends on each of said end standards, cross heads carried by each of said middle standards, secondary levers fulcrumed on each side of the body frame between, and connected with said primary levers and the cross heads of the same side, the outer ends of said primary levers being yieldably connected with the body frame.

6. In a straddle-type carrier, a body frame, three wheel-mounted standards supporting the ends and the middle of each side of the body frame and vertically independently movable within the sides thereof, the standards projecting above the body frame, load distributing leverage systems comprising primary levers fulcrumed nearer their outer ends on each of said end standards, cross heads carried by each of said middle standards, secondary levers fulcrumed on each side of the body-frame between, and connected with said primary levers and the cross heads of the same side, the outer ends of said primary levers being connected with the body frame, the fulcrums of said secondary levers being adjustable.

7. In a straddle-type carrier, a body frame, three wheel mounted standards supporting the ends and the middle of each side of the body-frame and vertically independently movable in the sides thereof, load distributing leverage systems comprising primary levers fulcrumed nearer their outer ends on each of said end standards, cross heads carried by each of said middle standards, secondary levers fulcrumed on each side of the body-frame between, and connected with said primary levers and the cross heads of the same side, the outer ends of said primary levers being connected with the body frame.

8. In a straddle type carrier, a body-frame, three wheel-mounted standards supporting the ends and the middle of each side of the body frame, and vertically, independently movable, load distributing leverage systems comprising primary levers fulcrumed nearer the outer ends of each of said end standards, cross heads carried by each of said middle standards, secondary levers pivoted on each side the body-frame between, and connected with said primary levers and the cross heads of the same side, the body frame provided at its ends with vertical spring housings, coil springs mounted in said housings, said springs being connected to the outer ends of said primary levers, whereby the latter are yieldably connected with the body frame.

9. In a straddle type carrier, a body-frame, three wheel-mounted standards supporting the ends and the middle of each side of the body frame, and vertically, independently movable, load distributing leverage systems comprising primary levers fulcrumed nearer the outer ends of each of said end standards, cross heads carried by each of said middle standards, secondary levers pivoted on each side the body frame between, and connected with said primary levers and the cross heads of the same side, the outer ends of said primary levers being connected with the body frame, said secondary levers provided with slotted centers and the pivot bearings of said levers being relatively adjustably secured to the frame sides, respectively.

10. In a straddle type carrier, a body-frame, three wheel mounted standards supporting the ends and the middle of each side of the body frame, and vertically independently movable, load distributing leverage systems comprising primary levers fulcrumed nearer the outer ends of each of said end standards, cross heads carried by each of said middle standards, secondary levers pivoted on each side the body frame between, and connected with said primary levers and the cross heads of the same side, the body frame provided at its ends with vertical spring housings, coil springs mounted in said housings, said springs being connected to the outer ends of said primary levers, whereby the latter are yieldably connected with the body frame, the pivots of the secondary levers being adjustable.

CARL F. GERLINGER.